Patented Jan. 13, 1931

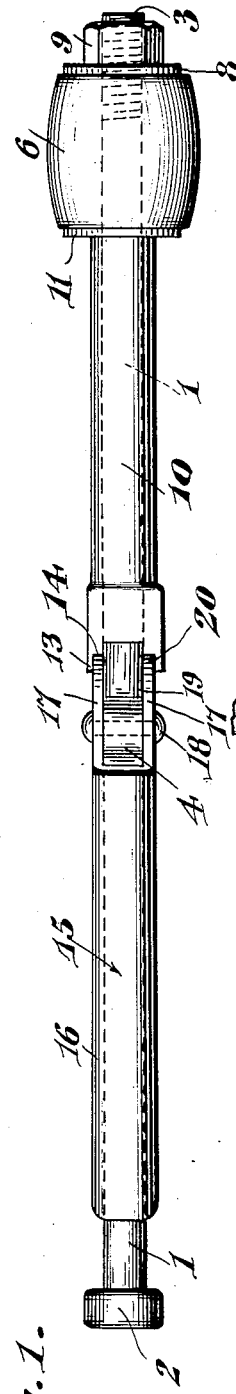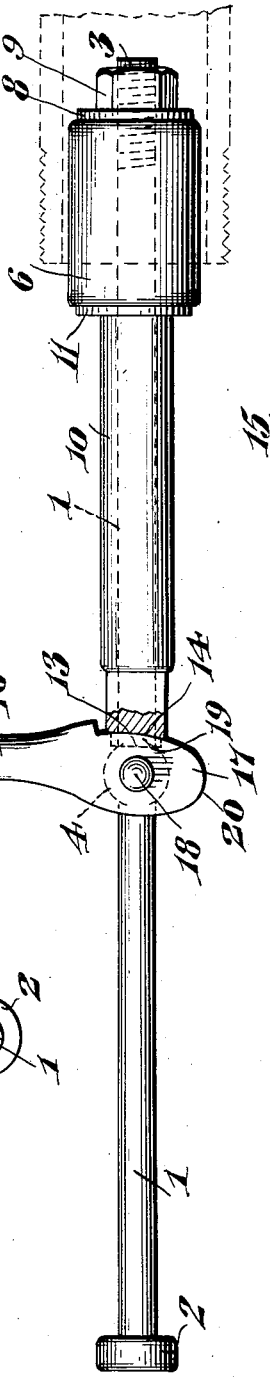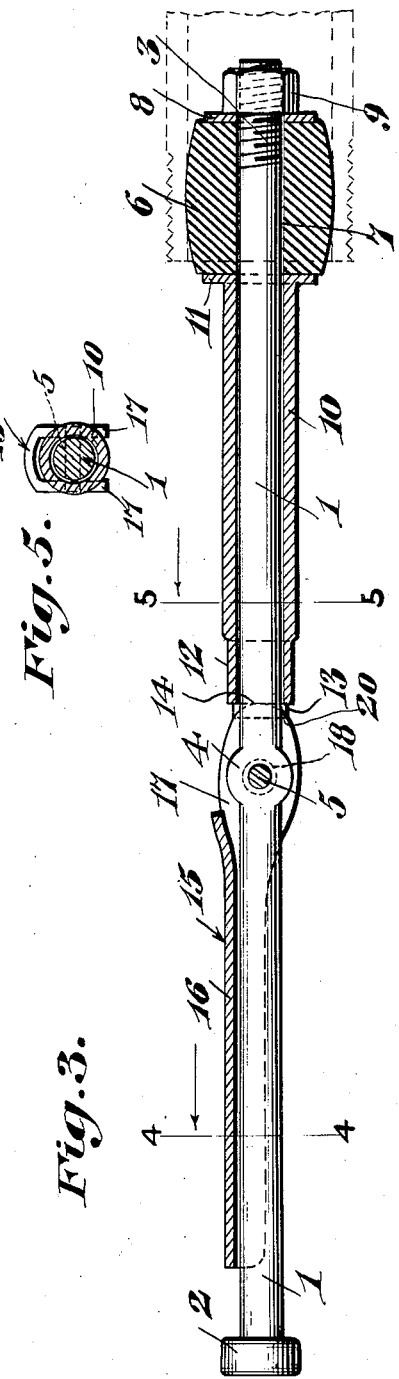

1,789,024

UNITED STATES PATENT OFFICE

OTTO W. ROSWELL, OF LOS ANGELES, CALIFORNIA

DEVICE FOR PLUGGING PIPES

Application filed November 17, 1928. Serial No. 320,195.

This invention relates to devices for plugging pipes and has as its general object to provide a device which may be conveniently emloyed by plumbers, steamfitters, gasfitters, and other workmen, for the purpose of plugging a pipe when it becomes necessary to sever a supply line either in installation work or repair work or for the purpose of threading the pipe or establishing some other type of connection of the pipe with another pipe or fixture.

Another object of the invention is to provide a plugging device the plugging element of which may be readily and instantly fitted into the end of a pipe to be plugged and immediately expanded so as to completely close and seal the pipe and prevent the escape of gas, water, or any other fluid or liquid which is supplied through the pipe.

Another object of the invention is to provide a pipe plugging device including an expansible plugging element and means operable instantly to expand the said element, the means being so constructed that when operated to effect expansion of the element it it will maintain its position of adjustment until reversely operated, thus adapting the device to be quickly fitted into a pipe to be plugged and adjusted to plug and seal the pipe and maintain the same sealed so long as is found necessary by the workman using the same, the invention further contemplating so constructing the expanding means for the plug that by the reverse adjustment, referred to, it may be permitted to instantly contract and thus be instantly removable from the pipe when desired.

Another object of the invention is to provide a pipe plugging device embodying an expansible plugging element so mounted that a number of elements of different external diameters may be provided and substituted one for another thus adapting the device for use in plugging pipes of different diameters.

Another object of the invention is to provide a pipe plugging device possessing the characteristics and advantages above recited and which device will be extremely simple in construction and highly efficient in operation and not subject to displacement or disarrangement of its parts when in position plugging a pipe.

While the accompanying drawings and the description which is to follow, constitute a disclosure of the preferred embodiment of the invention, it will be understood that various changes may be made within the scope of what is claimed.

In the accompanying drawings:

Figure 1 is a plan view of the device embodying the invention;

Fig 2 is a side elevation thereof, the operating lever for the expanding means for the plug element being shown in inactive or released position;

Figure 3 is a vertical longitudinal sectional view through the device, the stem of the device being shown in elevation as well as certain of the parts associated therewith;

Figure 4 is a vertical transverse sectional view taken substantially on the line 4—4 of Figure 3 looking in the direction indicated by the arrow;

Figure 5 is a similar view on the line 5—5 of Figure 3 looking in the direction indicated by the arrow.

The device embodying the invention includes, in its structure, a stem which is indicated in general by the numeral 1 and which may be of any suitable metal and this stem is provided at one end with a hand knob 2 and is threaded at its other end as indicated by the numeral 3. The stem is formed, intermediate its ends, with a flat sided, substantially circular boss indicated by the numeral 4 which is provided centrally with a transverse opening indicated by the numeral 5, the portions of the stem at the opposite sides of the boss or in other words the portions between the boss and the ends of the stem being of the same and uniform diameter and cylindrical in cross section. The stem just described constitutes a supporting means for the expansible plug element and the means which is provided for effecting expansion thereof, as will now be explained.

The expansible plug element is indicated by the numeral 6 and the same is preferably of soft rubber and comprises a cylindrical body of this material which is exteriorly of a diameter to adapt it to be readily fitted into a pipe of a predetermined bore or internal diameter, which is to be plugged, and preferably the body of the plug element will be of greater length than diameter and the same is provided axially with a bore 7 adapting it to be fitted more or less snugly upon that end of the stem 1 upon which the threads 3 are formed, a washer 8 being likewise fitted onto the threaded end of the stem and bearing against the outer end of the plug body, and a nut 9 being adjustably threaded onto this end of the stem and adjustable to bind against the washer and hold the washer, against movement, in different positions of adjustment along the portion of the stem to which it is fitted, a slight adjustment only being, however, necessary.

At this point it will be evident that, when the plug body is subjected to longitudinal compression, it, being of soft rubber, will have its intermediate portion expanded or bulged and therefore its diameter correspondingly increased, and the means provided for effecting such expansion of the plug body includes a sleeve 10 which is slidably mounted upon that portion of the stem 1 which is located between the boss 4 and the threaded end 3, this stem being provided at its forward end with an outstanding circumscribing flange 11 against which the inner end of the plug body abuts. At its rear or inner end, the sleeve 10 is formed with a flat sided extension 12 having recesses 13 formed therein at opposite sides thereof and it will be observed by reference to Figure 2 that the inner end walls of the recesses, which are indicated by the numeral 14, are of arcuate form. It will be observed by reference to Figures 1, 2 and 3 of the drawings that the washer 8 and flange 11 are of a diameter less than the diameter of the plug body 6 in the contracted condition of said body so that these parts cannot come in contact with the interior surface of the pipe to be plugged and in no way interfere with the insertion of the plug and the end of the stem upon which it is mounted, into the pipe.

The means for effecting expansion of the plug body 6 further includes a lever for effecting sliding movement of the sleeve 10 along the portion of the stem 1 upon which it is mounted so that the sleeve may exert pressure against the inner end of the plug body and the body expanded due to the pressure exerted and the abutment of its outer or forward end against the relatively fixed washer 8. The means provided for actuating the sleeve 10 to effect compression and consequent expansion of the plug body comprises a lever 15 which may be stamped from sheet metal and this lever preferably comprises a body or hand grip portion 16 which is preferably substantially semi-cylindrical so as to adapt it to embrace the upper side of that portion of the stem 1 which is located between the boss 4 and hand grip 2, when the lever is in the position shown in Figures 1, 3 and 4 of the drawings. At its forward end the lever terminates in spaced flat sided ears 17 which constitute extensions of the opposite sides of the hand grip portion 16 of the lever, and these extensions are disposed to straddle the stem 1 at the point of location of the boss 4 and a rivet 18 is secured through openings formed in said ears 17 and through the opening 5 formed in the boss 4 of the stem 1 and constitutes a pivot about which the lever may be swung to assume either the inactive or released position shown in Figure 2 or the active position shown in Figures 1, 3 and 4 of the drawings. As shown most clearly in Figures 2 and 3 of the drawings, the ears 17 have substantially the marginal outline of an ellipse so that their margins are eccentric to the pivot 18, the pivot being so located that one side margin of each ear will be located relatively close to the pivot as indicated by the numeral 19, whereas the end margins of each ear, indicated by the numeral 20, will be located more remote from the pivot and, as shown in Figure 2, when the lever 15 is in inactive position, the marginal portions 19 of the two ears 17 will be in engagement against the arcuate inner end walls 14 of the recesses 13 and at this time the sleeve 10 will be in an inwardly or rearwardly shifted position as illustrated in the said Figure 2 and the plug body 6 will be contracted thus adapting the device to be inserted into a pipe to be plugged, the pipe being shown in broken lines in Figures 2 and 3 of the drawings. However when the lever 15 is swung about the pivot 18, the eccentric edge portions of the ears 17 of the lever will ride against the said arcuate inner end walls 14 of the recesses 13 in the inner end of the sleeve 10, and, due to the eccentric disposition of the edges of the ears 17, the sleeve 10 will be forced forwardly along the stem 1 and the plug body will be longitudinally compressed thus effecting its expansion to substantially the form shown in Figures 1 and 3 of the drawings so that it will completely close the bore of the pipe to be plugged.

From the foregoing description of the invention it will be evident that the device may be readily inserted into a pipe to be plugged and the hand lever 15 instantly swung from the position shown in Figue 2, to the position shown in Figure 3, to cause the eccentric marginal portions of the ears 17 of the said lever to ride against the portion of the sleeve 10 against which they abut thus effecting shifting of the sleeve and an immediate expansion, circumferentially, of the plug body 6 to seal and close the pipe, and at this point it will be apparent that in this position of the lever, as shown in Figures 1, 3 and 4, the same will extend along and in embracing relation to that portion of the stem 1 which is located between the boss 4 and hand knob 2 and inasmuch as, in this position of the lever, the higher points of the end marginal portions 20 of the ears 17 will be in engagement against the arcuate inner end walls 14 of the recesses 13 in the inner end of the sleeve 10, the tendency of the body 6 to contract and therefore the force exerted longitudinally against the sleeve 10 tending to slide the same inwardly or rearwardly along the stem 1, will result in a locking of the parts so that there can be no accidental displacement of the lever to permit such movement of the sleeve as would allow for contraction of the plug body and therefore the device, adjusted in the manner stated, may be left in place in the pipe so long as is necessary to permit of repairs or the like being made. On the other hand, when it is desired to remove the plugging device from the pipe, it is only necessary to swing the hand lever 15 outwardly to the position shown in Figure 2 whereupon the plug body will immediately contract due to the resiliency or elasticity of the material of which it is formed, thus permitting of instant removal of the device from the pipe.

It will be understood that by removing the nut 9 from the threaded end of the stem 1, a plug body of one diameter may be removed from the said stem and a plug body of a larger or smaller diameter may be substituted therefor depending upon the internal diameter of the pipe to be plugged, and it will also be evident that inasmuch as the stem is threaded for a sufficient portion of its length to permit of considerable adjustment of the nut 9, plug bodies of different lengths may be readily substituted for one another.

Having thus described the invention, what I claim is:

1. A device for plugging pipes comprising a stem, an abutment upon the stem, an elastic plug body mounted upon the stem and engaging against the abutment, a sleeve mounted slidably upon the stem and having a flange at one end engaging against the said body at the side thereof opposite the side which engages against the abutment and constituting means for longitudinally compressing the said body and circumferentially expanding the same when the sleeve is moved along the stem in the direction of the abutment, means upon the stem coacting with the said sleeve and adjustable to effect longitudinal movement of the sleeve upon the stem, the said means comprising a lever having spaced ears straddling the stem, means pivotally connecting the ears with the stem, the ears having marginal portions eccentric to the pivot and the said sleeve having curves seating portions against which the said eccentric edges of the ears abut, the lever being of approximately semi-cylindrical form whereby to provide for its disposition in position embracing a side of the stem when the portions of the edges of the ears which are remote from the pivot are in engagement with the said portions of the sleeve.

2. A device for plugging pipes comprising an elongated stem having an abutment at one end and a knob at the opposite end, an elastic plug body mounted on the stem with one end thereof in engagement with the abutment, a sleeve slidably mounted upon the stem having a flange at one end for engaging against the other end of the plug, the opposite end of the sleeve being provided with bearing faces, a lever rockably mounted upon the stem at a point intermediate its ends provided with ears straddling the stem having marginal portions eccentric to the pivot for engaging the bearing faces of the sleeve, the lever being of approximately semi-cylindrical form whereby to provide for its disposition in position embracing a side of the stem when the portions on the edges of the ears which are remote from the pivot are in engagement with said bearing faces of the sleeve.

In testimony whereof I affix my signature.

OTTO W. ROSWELL.